United States Patent [19]
Doolittle

[11] Patent Number: 5,244,141
[45] Date of Patent: Sep. 14, 1993

[54] METHOD OF MANUFACTURING MULTI-CHARACTERISTIC SMALL THIN FLAT METALLIC PARTS

[76] Inventor: Milton A. Doolittle, 123 Village Center Dr., Torrington, Conn. 06790

[21] Appl. No.: 883,842

[22] Filed: May 15, 1992

[51] Int. Cl.⁵ .............................................. B23K 28/02
[52] U.S. Cl. ...................................... 228/160; 29/411
[58] Field of Search ............... 228/160; 29/411, 564.6, 29/412, 417; 83/50

[56] References Cited

U.S. PATENT DOCUMENTS

| | | | |
|---|---|---|---|
| 4,210,041 | 7/1980 | Mitman et al. | 83/50 X |
| 4,458,413 | 7/1984 | Tatum et al. | 228/161 X |
| 4,958,426 | 9/1990 | Endo | 29/411 |
| 5,043,548 | 8/1991 | Whitney et al. | 219/76.16 |

FOREIGN PATENT DOCUMENTS 142088  6/1987  Japan ............................... 219/121.64

Primary Examiner—Kenneth J. Ramsey
Attorney, Agent, or Firm—McCormick, Paulding & Huber

[57] ABSTRACT

A method of manufacturing multi-characteristic small thin flat metallic parts comprising the steps of providing first and second strips of metal differing in at least one characteristic. The metal strips are welded together along their edges in an electron beam welding process and the small multi-characteristic parts are blanked transversely from their resulting strip whereby each part has a first portion deriving from the first strip and a second portion deriving from the second strip.

10 Claims, 2 Drawing Sheets

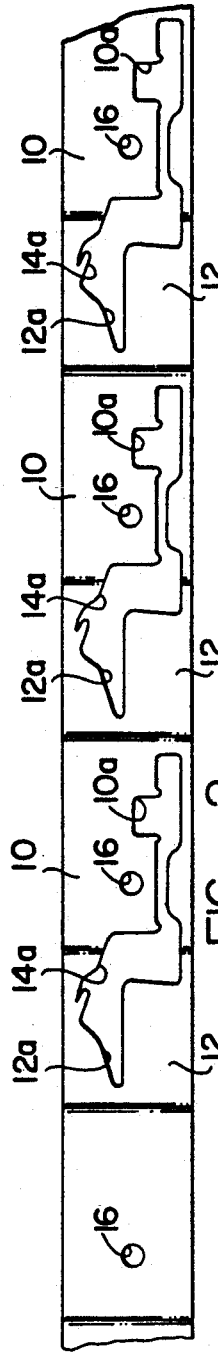
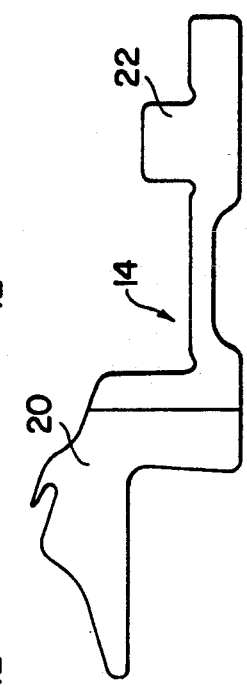
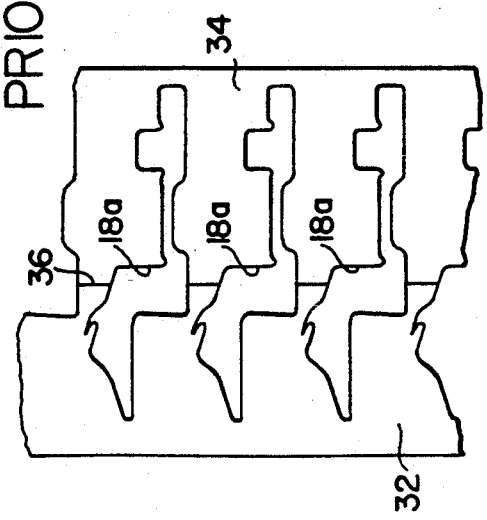
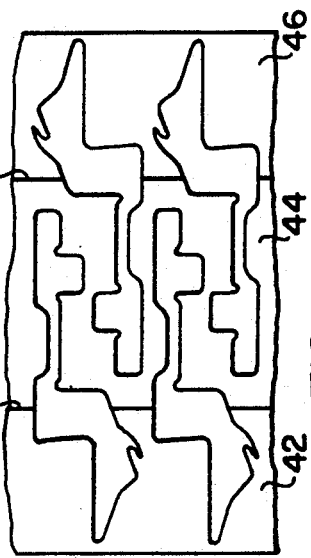

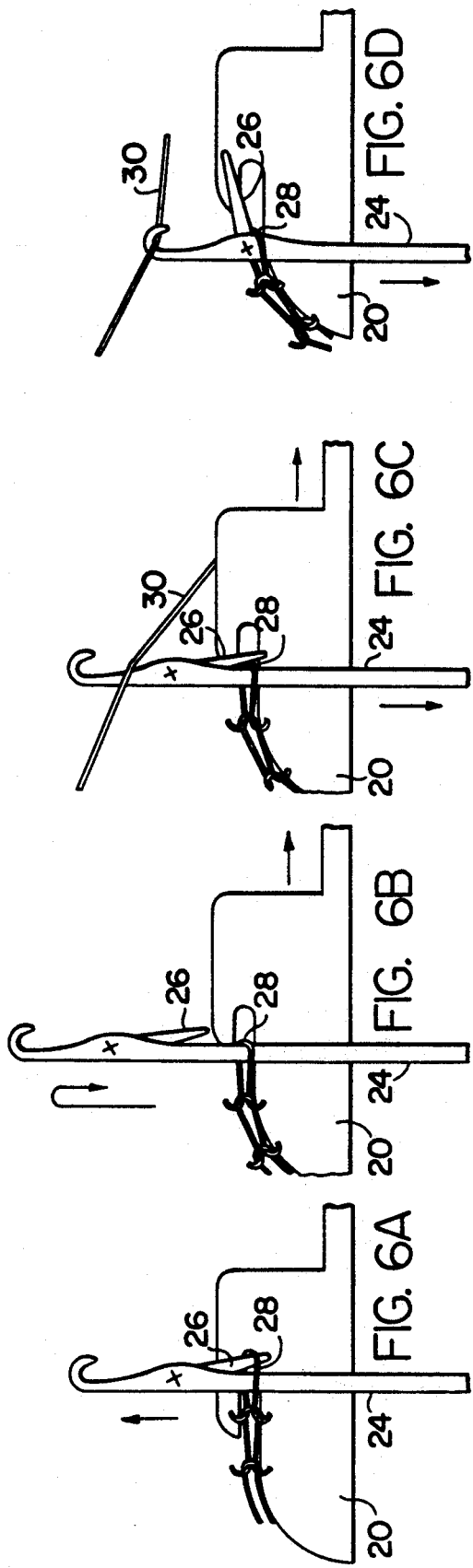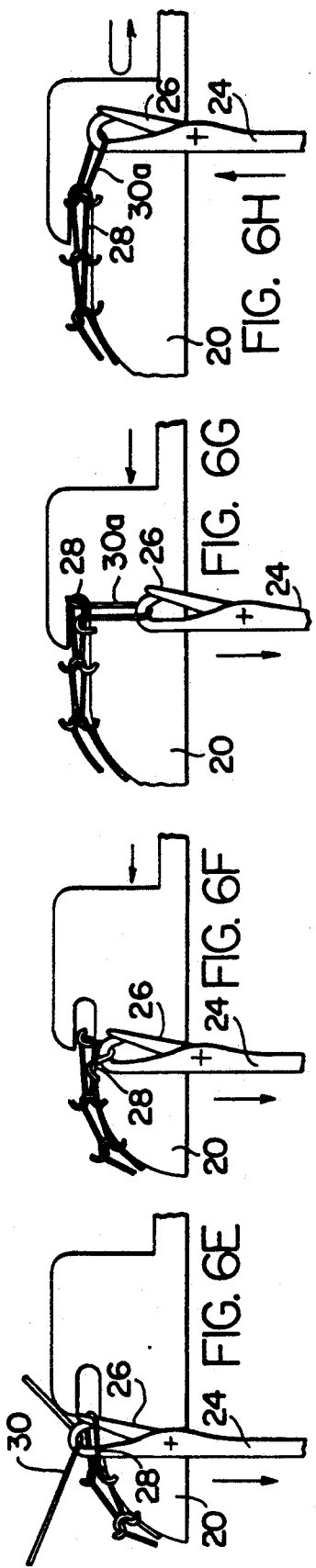

METHOD OF MANUFACTURING MULTI-CHARACTERISTIC SMALL THIN FLAT METALLIC PARTS

BACKGROUND OF THE INVENTION

The present invention relates to the manufacture of small thin flat metallic parts which are non-uniform with regard to at least one significant characteristic. That is, the parts may be of non-uniform thickness, non-uniform material etc. and may therefor be fairly described as "multi-characteristic parts". Such parts have been manufactured in the past, as for example, in a "step rolling" operation resulting in a metal strip of non-uniform thickness longitudinally. A subsequent blanking operation included at least one interface between sections of differing thickness. As will be apparent, parts of non-uniform thickness or "multi-gage" parts have been thus provided.

It is the general object of the present invention to provide an improved method of manufacture for both multi-gage and other multi-characteristic parts wherein the step rolling operation is eliminated and an electron beam welding step is substituted therefor, substantial advantage being realized in the elimination of metal waste and particularly in flexibility of the method.

SUMMARY OF THE PRESENT INVENTION

In fulfillment of the foregoing object, a first elongated strip of metal which extends longitudinally for a known but indeterminate length is provided. A second strip of metal is also provided and has at least one characteristic which differs from that of the first strip of metal. For example, the strips may differ in thickness, material from which they are formed, etc. The second strip of metal is substantially coextensive longitudinally with the first strip of metal and the two strips of metal are positioned in edge-wise contiguous and substantially co-planar relationship. The longitudinal edges of the two strips may be butted, lapped or positioned in other welding arrangements. An electron beam welding process is then carried out to join the two strips together in side-by-side substantially co-planar relationship along a longitudinally extending weld zone. Thereafter, a series of like small parts are blanked or otherwise severed from the welded strip with each part extending transversely relative to the strip so as to provide a first portion of each part which derives from the first strip and a second portion of each part which derives from the second strip.

As mentioned, the thin flat metallic parts may differ in a variety of characteristics. For example, each of the parts may have first and second portions of the same thickness but of different material. The first and second portions of each part may be of differing thickness. Still further, the parts may have first and second portions of differing thickness and the same material or, alternatively, the parts may have first and second portions with the same or differing thickness and with the same or differing materials.

In an illustrative example of the method of the present invention, a "sinker", comprising a multi-gage thin flat metallic part used extensively in the knitting industry is provided with a first portion of 1095 steel and of 0.010 thousandths thickness whereas a second portion thereof also of 1095 steel, has a 0.020 thousandths thickness.

The limitations imposed on the finished parts by the step rolling operation of the prior art are readily overcome with the present method. That is, the variation in thickness which can be achieved with the step rolling process of the prior art is practically limited to approximately a 50% reduction whereas no similar limit is encountered with the present method. Further, the present method is readily adaptable to parts having first and second portions of either the same or differing thickness and of differing material. Such structure is difficult if not impossible to achieve with the prior art method.

DESCRIPTION OF THE DRAWINGS

FIG. 1 of the drawings is a side view of a prior art strip of metal of varying thickness.

FIG. 2 is a top view of the prior art strip of metal with "sinkers" blanked therefrom and with each "sinker" having at least two portions of differing thickness.

FIG. 3 is an enlarged side view of the "sinker".

FIG. 4 is a top view of two strips of metal welded together in an electron beam welding process and thereafter blanked in accordance with the present invention.

FIG. 5 is an enlarged side view of the strip of FIG. 4.

FIGS. 6A through 6H are sequential schematic representations of a front portion of a sinker in co-operation with a knitting needle.

FIG. 7 is a top view of three strips of metal welded together and thereafter blanked in a pattern varying from that of FIG. 4.

DESCRIPTION OF PREFERRED EMBODIMENTS

Referring to the prior art and particularly to FIGS. 1 and 2, it will be apparent that a strip such as best illustrated in the FIG. 1 side view can be provided through an intermittent or "step" rolling operation. That is, relatively thick portions 10,10 of the strip may represent the initial thickness of the strip whereas relatively thin portions 12,12 represent the intermittent or step rolled portions thereof. As mentioned, step rolling can be accomplished to a maximum reduction ratio of approximately 50% but excessive reduction beyond such ratio is either impractical or impossible of attainment. Thus, if the sections 10,10 are of 0.020 thousandths thickness the sections 12,12 may be reduced to approximately 0.010 thousandths thickness in the manufacture of parts 14,14, FIG. 3, the outlines of which are illustrated in FIG. 2 at 14a,14a. The parts 14,14 are known in the knitting industry as "sinkers" and have front end portions 12a,12a of reduced thickness with rear end portions 10a,10a of the initial or original thickness of the strip. A conventional blanking operation may be employed in severing the sinkers 14,14 from the strip with locating holes 16,16 employed as an aid in achieving precise location of the interface between different thicknesses on each sinker. As will be apparent, and in addition to the limitations on reduction in thickness, there is a substantial amount of waste material in the manufacturing process of the prior art as set forth in FIGS. 1 and 2.

The improved method of the present invention can be employed in the manufacture of a wide variety of multi-characteristic parts including knitting machine "sinkers", "transfer jacks" et al. As mentioned, the manner in which the characteristics of the parts vary from one portion to another include variations in thickness, material etc. The illustrative example disclosed herein may be referred to as a multi-gage part wherein first and second portions of each part are of like material but different thickness. More specifically, the sinker manufactured in the illustrative example of the method of the present invention is a conventional part used in tubetype or circular knitting machines and illustrated at 14 in FIG. 3. Each sinker 14 has a first or front end portion 20 which is an "operating" portion and a second or rear end portion 22 which constitutes a driven portion. More specifically, the second or rear end portion 22 of each sinker 14 is normally cam driven in a tube type or circular knitting machine.

The manner in which a sinker co-operates with a knitting needle in a tube type or "circular" knitting machine is illustrated in general in FIGS. 6A-H. The knitting operation depicted in FIGS. 6A-H, is known as a "single jersey" knit and hundreds of thousands of needles and sinkers are employed in such operations throughout the world. In FIG. 6A, knitting needle 24, also cam operated, is shown at an intermediate position in its upward stroke, the latch of the needle 26 is in an open position and, in the trade, the position is known as a "tuck position". In FIG. 6B the knitting needle 24 has terminated its upward movement and commenced a reverse or downward movement with the loop of fabric 28 now clear of the latch 26 and residing therebeneath. This is known as a "clearing position". Concurrently the sinker has commenced rearward movement. In FIG. 6C the needle and sinker are shown in a "yarn feeding position" with a section of yarn 30 disposed behind the sinker portion 20 and extending upwardly and forwardly so as to be captured by the hook of the needle on further downward movement thereof. In FIG. D, the yarn 30 has been captured by the needle so as to be drawn slightly downwardly in further downward movement of the needle while the latch 26 has been swung to a partially closed position by a preceding loop 28 extending about the needle 24. This is known as the "latch closing position". In FIG. 6E, the needle and sinker are shown in a "casting off position" wherein the latch has achieved its fully closed position, the yarn 30 has been drawn downwardly and is about to enter the loop 28. Downward movement of the needle continues in FIG. 6F to a position known as a "knockover position" wherein the yarn 30 has been drawn downwardly through the loop 28 in an initial movement with a new loop partially formed. Still further downward movement of the needle coupled with concurrent forward movement of the sinker in FIG. 6G results in an extension of a loop 30a formed from the yarn 30 to approximately its full length whereupon the needle 24 and the sinker portion 20 both reverse direction as illustrated in FIG. 6H. From the FIG. 6H position, the needle and sinker return to the FIG. 6A position whereupon the cycle is repeated.

The cycle described may be repeated at rates as high as 5000 per minute in tube-type or circular knitting machines with all of the obvious accompanying stresses on both the needle and the sinker in rapid movement and particularly in the rapid reversal of direction of movement which occurs during each cycle. As mentioned, both the sinker and the needle are generally cam driven from rear-end portions thereof and the sinkers are captured within slots for rectilinear guidance during the necessarily precise reciprocal action. It is also to be noted that the front ends of the sinkers and needles may reside in an extremely crowded environment with the thinnest possible gage metal thus desirable at the front end portion 20 of the sinker. The rear-end thereof, engaged and driven by a cam, should of course be substantially thicker and stronger. Thus, one conventional sinker design includes a front end portion of 1095 steel and approximately, 0.010 thousandths in thickness while the rear-end portion, also of 1095 steel is of 0.020 thousandths thickness.

Reverting now to FIG. 4, a strip of metal 32 may be regarded as 1095 steel of 0.010 thousandths thickness while a strip 34 is of 1095 steel and 0.020 thousandths thickness. As will be apparent, the strips 32 and 34 are elongated and positioned in side-by-side arrangement with their inner longitudinal edges contiguous and with the strips substantially in co-planar relationship. The inner edges may be in butted or lapped arrangement or in other inter-relationships suitable for electron beam welding.

The electron beam welding process is well known and readily applicable to a wide variety of steel including 1095 strip steel. A weld line or zone 36 accomplished by electron beam welding extends longitudinally and joins the strips 32 and 34 in a high quality and high strength weld meeting or exceeding characteristics of the parent metal. Thus, the welded strip 32,34 may be readily blanked to provide a series of sinkers each extending transversely across the welded strip as illustrated in FIG. 4 by the cutouts or openings 18a,18a. The weld line or zone 36 is of course located precisely at a desired position on each sinker or other part in order to provide the desired relationship of the first and second portions of each part. Locating holes such as 16 are unnecessary. When a three-part strip such as that of FIG. 7 is to be employed in the manufacture of sinkers, it is of course possible to provide a parallel pair of electron beam welds 38,40 concurrently or sequentially with three strips of metal 42,44, and 46 positioned in side-by-side relationship as illustrated. Strips 42 and 46 may be 10 thousandths thick with the strip 44 having a thickness of 20 thousandths.

The flexibility of the method of the present invention has been mentioned above and it should be noted that various materials such a metal, carbide, etc. can be joined together in accordance with the method. Similarly, the ability to exceed the thickness limitations encountered in a step-rolling operation will be readily apparent. Still further, material waste is greatly reduced.

I claim:

1. A method of manufacturing multi-characteristic small thin flat metallic parts comprising the steps of; providing a first elongated strip of metal which extends longitudinally for a known but indeterminate length, providing a second strip of metal having at least one characteristic differing from that of said first strip of metal, said second strip being at least substantially coextensive longitudinally with said first strip, positioning said two strips of metal in edge-wise contiguous substantially co-planar relationship and in arrangement for butt welding, electron beam butt welding said two strips together in side-by side substantially co-planar relationship along a longitudinally extending weld zone, blanking a series of like small parts from said welded together strips with each part extending transversely relative to the strip and with a first portion of each part deriving from said first strip and a second laterally adjacent portion of each part deriving from said second strip.

2. A method of manufacturing multi-characteristic small thin flat metallic parts as set forth in claim 1 wherein each of the parts is provided with first and second portions of the same thickness but of different material.

3. A method of manufacturing multi-characteristic small thin flat metallic parts as set forth in claim 1 wherein each of the parts is provided with first and second portions of differing thickness.

4. A method of manufacturing multi-characteristic small thin flat metallic parts as set forth in claim 3 wherein each of the parts is provided with first and second portions which are formed of the same material.

5. A method of manufacturing multi-characteristic small thin flat metallic parts as set forth in claim 3 wherein each of the parts has first and second portions which are formed of different materials which are nevertheless compatible for electron beam welding.

6. A method of manufacturing multi-characteristic small thin flat metallic parts as set forth in claim 1 wherein three adjacent strips of metal are welded together with parts subsequently severed therefrom in alternating positional relationship.

7. A method of manufacturing multi-characteristic small thin flat metallic parts as set forth in claim 1 wherein each of the parts has a first portion formed of 1095 steel and a second portion formed of carbide.

8. A method of manufacturing multi-characteristic small thin flat metallic parts as set forth in claim 1 wherein each of the parts has first and second portions each of 1095 steel with the first portion 0.010 thousandths in thickness and the second portion 0.020 thousandths in thickness.

9. A method of manufacturing multi-characteristic small thin flat metallic parts as set forth in claim 8 wherein the parts are adapted to be used in knitting machines with the first portion an operating end and the second portion a driven end.

10. A method of manufacturing multi-characteristic small thin flat metallic parts as set forth in claim 9 wherein the parts are sinkers employed in knitting machines.

* * * * *

UNITED STATES PATENT AND TRADEMARK OFFICE
CERTIFICATE OF CORRECTION

PATENT NO. : 5,244,141

DATED : September 14, 1993

INVENTOR(S) : Milton A. Doolittle

It is certified that error appears in the above-identified patent and that said Letters Patent is hereby corrected as shown below:

TITLE PAGE, ITEM [76]

Please delete "Milton A. Doolittle, 123 Village Center Dr., Torrington, Conn. 06790" and substitute—Louis F.M. Herzog, 1871 Gum Tree Road, Asheboro, NC 27203—.

Signed and Sealed this

Thirty-first Day of May, 1994

*Attest:*

*Attesting Officer*

BRUCE LEHMAN

*Commissioner of Patents and Trademarks*